United States Patent
Yamazaki et al.

(10) Patent No.: US 7,815,354 B2
(45) Date of Patent: Oct. 19, 2010

(54) VEHICLE LAMP HOUSING WITH TRANSPARENT COVER WELDED THEREON, AND METHOD

(75) Inventors: Kazuhiro Yamazaki, Shizuoka (JP); Michihiko Suzuki, Shizuoka (JP); Ryosuke Yasuda, Shizuoka (JP); Haruo Otani, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 388 days.

(21) Appl. No.: 11/823,037

(22) Filed: Jun. 26, 2007

(65) Prior Publication Data
US 2007/0295719 A1 Dec. 27, 2007

(30) Foreign Application Priority Data
Jun. 26, 2006 (JP) ............... 2006-175336

(51) Int. Cl.
*F21V 15/01* (2006.01)
*G02B 7/00* (2006.01)
*B29C 65/14* (2006.01)

(52) U.S. Cl. ............... 362/546; 362/507; 362/362; 264/1.36; 156/272.8; 156/273.7; 156/275.1

(58) Field of Classification Search ............... 362/507, 362/546, 362; 156/272.8, 273.7, 275.1; 264/1.36
See application file for complete search history.

(56) References Cited

U.S. PATENT DOCUMENTS 4,601,927 A * 7/1986 Durfee .............. 156/292
4,654,760 A * 3/1987 Matheson et al. ........ 362/546
5,893,959 A * 4/1999 Muellich ................ 156/272.8
6,464,374 B2 * 10/2002 Akiyama et al. ........... 362/267

(Continued)

FOREIGN PATENT DOCUMENTS

JP 6-325603 11/1994

(Continued)

OTHER PUBLICATIONS

Korean Office Action with English Translation from Application No. 10-2007-0061541 mailed May 9, 2008 (9 pages).

(Continued)

*Primary Examiner*—Ismael Negron
(74) *Attorney, Agent, or Firm*—Osha Liang LLP (57) ABSTRACT

A method of manufacturing a vehicle lamp includes providing a housing having a front opening and a transparent cover having a curved front face and a rear face having a welding face portion. The welding face portion of the transparent cover is placed in a closely contacting state with respect to the housing and the transparent cover is joined with the housing so as to close the front opening of the housing by irradiating a welding light ray toward the welding face portion through the transparent cover. The placing includes applying a pressing force against the housing to the transparent cover in a predetermined direction such that an angle of the welding face portion of the transparent cover with respect to the predetermined direction is closer to a right angle than an angle of the front face of the transparent cover corresponding to the welding surface with respect to the predetermined direction.

10 Claims, 5 Drawing Sheets

U.S. PATENT DOCUMENTS

| | | |
|---|---|---|
| 6,478,451 B2 | 11/2002 | Akiyama et al. |
| 6,592,239 B1 * | 7/2003 | Akiyama et al. ............ 362/267 |
| 7,118,250 B2 | 10/2006 | Matsunaga et al. |
| 7,287,877 B2 * | 10/2007 | Yasuda et al. .............. 264/1.37 |
| 7,329,025 B2 * | 2/2008 | Yasuda et al. ............ 156/272.8 |
| 7,345,258 B2 * | 3/2008 | Yasuda et al. .......... 219/121.63 |
| 2004/0200569 A1 * | 10/2004 | Weiblen et al. .......... 156/272.8 |
| 2005/0030751 A1 * | 2/2005 | Matsunaga et al. .......... 362/267 |
| 2005/0225991 A1 * | 10/2005 | Yamazaki et al. ........... 362/362 |
| 2006/0077681 A1 * | 4/2006 | Ikeda et al. ................. 362/510 |
| 2007/0081352 A1 * | 4/2007 | Yamamoto ................. 362/509 |

FOREIGN PATENT DOCUMENTS

JP      2005-339873      12/2005

OTHER PUBLICATIONS

Abstract of JP6325603, Publication Date Nov. 25, 1994, Koito Mfg Co Ltd (1 page).

English Abstract of JP2005339873 published Dec. 8, 2005, 2 pages.

\* cited by examiner

VEHICLE LAMP HOUSING WITH TRANSPARENT COVER WELDED THEREON, AND METHOD

CROSS-REFERENCE TO RELATED APPLICATIONS

The present invention claims priority from Japanese Patent Application No. 2006-175336 filed on Jun. 26, 2006, the entire content of which is incorporated herein by reference.

BACKGROUND OF INVENTION

1. Field of the Invention

The present invention relates to a vehicle lamp and a method of manufacturing the vehicle lamp. More specifically, the present invention relates to a technique of reliably joining a housing, inside of which a light source, etc. is housed, and a transparent cover, which closes a front opening of the housing.

2. Background Art

In a method of manufacturing a vehicle lamp such as a lamp for an automobile, it is necessary to attach a transparent cover, generally called as a lens, to a housing so as to cover a front opening thereof.

When attaching the transparent cover and the housing, the related art generally employs a method in which a seal leg is protrusively provided at a peripheral edge portion of the transparent cover while a groove for receiving the seal leg is formed on the housing. The seal leg of the transparent cover is received by the groove of the housing via a sealing material or an adhesive. According to this attaching method, the seal leg and the groove are provided so as to protrude outwardly from the peripheral edge portions of the transparent cover and the housing. Thus, when seeing the transparent cover from a front side, there appears a portion having a relatively large area where light does not pass through (that is, a dark portion) at the peripheral edge portion of the transparent cover. Therefore, there has been a problem that a light irradiation area is relatively small as compared with the entire size.

In view of such a problem, there has been proposed a method in which the seal leg of the transparent cover is directly joined to a joining surface portion of the housing. When the seal leg of the transparent cover is directly joined to the housing, a width of a joining space is quite small and, thus, the dark portion at the peripheral edge portion of the transparent cover can be made smaller. As a means for such a direct joining, there have been generally employed hot plate welding, vibration welding, etc. According to these means, the joining is performed in such a manner that, at the joining portion between the transparent cover and the housing, materials of the transparent cover and the housing exist in a mixed molten state, and then are cooled and solidified. However, there is a problem that excessive molten materials stick out from the joining portion, thereby deteriorating an appearance when the stuck out portion is seen from the front side via the transparent cover.

Further, because configurations to which the above methods can be applied is limited (e.g., an inclination angle is limited; it is required to be substantially flat in a vibration direction in the vibration welding, and it cannot be steeply inclined with respect to a pressing direction of a hot plate in the hot plate welding), these methods cannot cope with the recent needs of a three-dimensional design.

There has been proposed another method in which the transparent cover is joined to the housing by laser welding. According to the laser welding, a molten state of the materials (that is, irradiation energy at the joining portion) can be controlled to be constant by controlling a laser output, a spot diameter at the joining portion, and a scanning speed. Thus, the sticking-out of the molten materials due to the excessive melting can be prevented, thereby enabling the method to cope with a complicated configuration. When a laser light is transmitted through the transparent cover and irradiated on the housing, the housing is heated and molten, and the heat is transmitted to the transparent cover, whereby both the transparent cover and the housing are molten and are adhered to each other.

However, according to a light welding, such as the laser welding, a defective joining occurs when a welding portion of the transparent cover and a welding portion of the housing are not reliably in contact with each other.

Nevertheless, because the transparent cover and the housing of a vehicle lamp are resin molded parts, it is difficult to obtain a shape in conformity with the actual design due to an influence of a warpage or a flexure after the molding. Thus, it is difficult to surely make the transparent cover contact with the housing along the entire periphery thereof. When the transparent cover is not surely made in contact with the housing, the heat applied to the housing by the irradiation of a light ray, such as laser light, cannot be transmitted the transparent cover and, thus, the welding cannot be performed.

SUMMARY OF INVENTION

One or more embodiments of the present invention ensure a reliable contact between a transparent cover and a housing when joining the transparent cover and the housing by light ray welding.

According to one aspect of the invention, a vehicle lamp includes a housing, and a transparent cover which is joined to the housing by a light ray welding so as to close a front opening of the housing. A front face of the transparent cover is curved, and a rear face of the transparent cover includes a welding face portion, which is formed along a circumferential portion of the rear face and is welded to the housing. In at least one section of the transparent cover, respective end portions of the front face corresponding to the welding face portion are inclined in different directions, and the welding face portion is inclined with respect to the end portions of the front face such that an angle of the welding face portion with respect to a reference line, which passes through the transparent cover and forms equal angles with respect to the respective end portions of the front face, is closer to a right angle than the angle of each of the end portions of the front face with respect to the reference line.

According to another aspect of the invention, a method of manufacturing a vehicle lamp includes providing a housing having a front opening, providing a transparent cover including a front face which is curved and a rear face which has a welding face portion along a circumferential portion thereof, placing the welding face portion of the transparent cover in a closely contacting state with respect to the housing, and joining the transparent cover and the housing so as to close the front opening of the housing by irradiating a welding light ray toward the welding face portion through the transparent cover. The placing includes applying a pressing force against the housing to the transparent cover in a predetermined direction such that an angle of the welding face portion of the transparent cover with respect to the predetermined direction is closer to a right angle than an angle of the front face of the transparent cover corresponding to the welding surface with respect to the predetermined direction.

According to the above aspects of the invention, the inclination angle of the welding face portion of the transparent cover with respect to the pressing direction is closer to a right angle than the inclination angle of the front face of the transparent cover with respect to the pressing direction. Thus, the pressing force reliably acts between the transparent cover and the housing in spite of the degree of the curvature of the front face of the transparent cover, whereby the welding face portion of the transparent cover can be closely contacted to the housing. Namely, a transmission of the pressing force can be ensured to place the welding face portion of the transparent cover into contact with the housing is transmitted.

Other aspects and advantages of the invention will be apparent from the following description and the appended claims.

DETAILED DESCRIPTION

Hereinafter, a vehicle lamp and a method of manufacturing the vehicle lamp according to exemplary embodiments of the invention will be explained with reference to the drawings.

Figure 1:
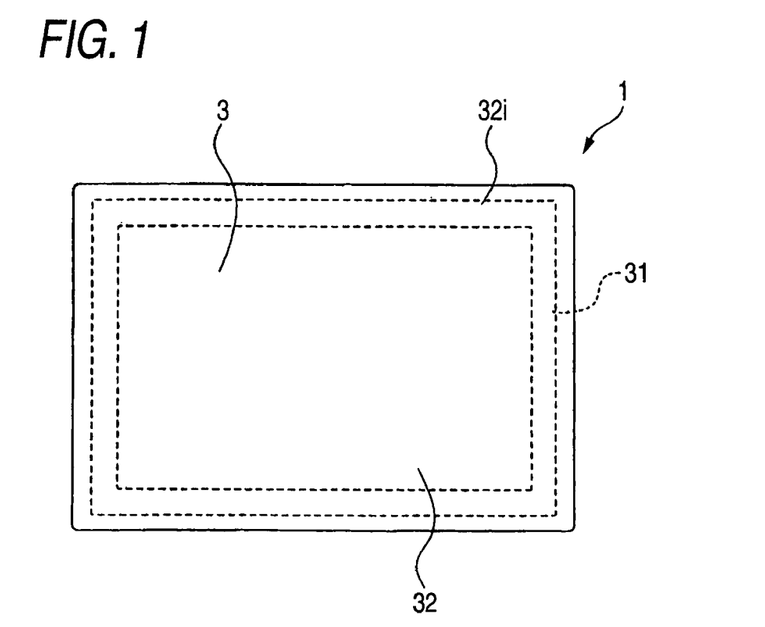
FIG. 1 is a schematic front view showing a vehicle lamp according to an exemplary embodiment of the invention.
Figure 2:
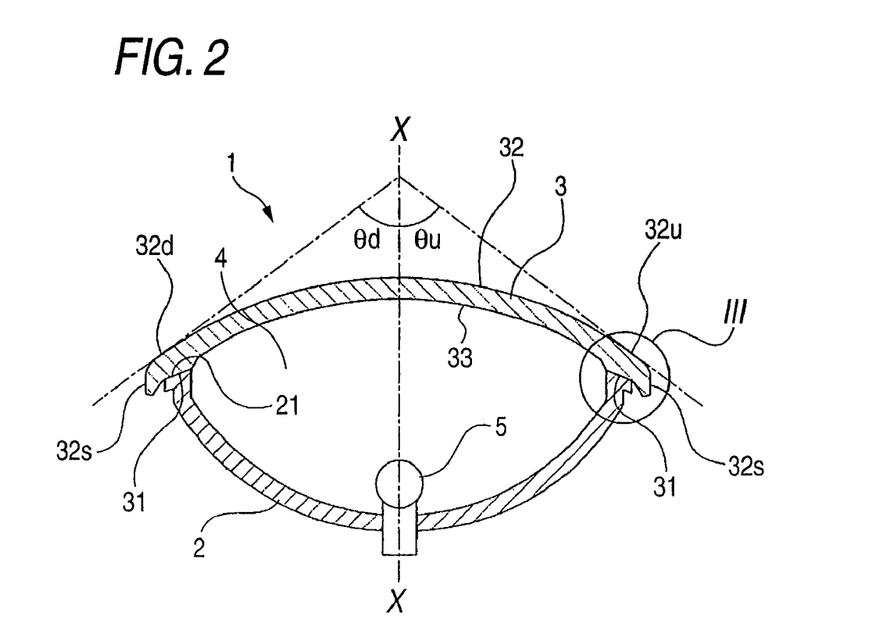
FIG. 2 is a schematic vertical sectional view of the vehicle lamp shown in FIG. 1.

FIG. 1 shows a schematic front view of a vehicle lamp according to an exemplary embodiment of the invention, and FIG. 2 shows a schematic longitudinal sectional view of the vehicle lamp.

The lamp 1 is configured such that an opening on a front face of a housing 2 is covered by a transparent cover 3, and a light source 5 is disposed inside a lamp chamber 4 defined by the housing 2 and the transparent cover 3.

A welding face portion 31 is formed along the entire circumferential portion of the rear face of the transparent cover 3, and the welding face portion 31 is joined to a welding face portion 21 formed along a peripheral edge portion of the opening on the front face of the housing 2 by light ray welding. More specifically, a welding light ray, which is a coherent/incoherent electromagnetic wave such as a laser, a visible light ray, an ultraviolet ray, or an infrared ray, is irradiated from the front face side of the transparent cover 3 onto the welding face portion 21 of the housing 2 through the transparent cover 3 in a closely contacting state with the welding face portion 31. A portion 32i corresponding to the welding face portion 31 of the front face 32 of the transparent cover will be hereinafter referred to as a light incident plane. When the welding light ray is irradiated, the welding face portion 21 is brought into an excited state due to the irradiation of the welding light ray (the electromagnetic wave) and generates heat. According to this heat, both the welding face portion 21 and the welding face portion 31 of the transparent cover 3, which is in the closely contacting state with the welding face portion 21, are brought into a molten state, whereby the resin materials of the housing 2 and the transparent cover 3 become integrated at a boundary where the two welding face portions 21, 31 contact to each other. Then, after the completion of the irradiation of the welding light ray (the electromagnetic wave), the portions that are brought into the molten state are cooled and solidified, whereby the transparent cover 3 is integrally joined to the housing 2.

As described above, because the transparent cover 3 is required to transmit the welding light ray, such as a laser, the transparent cover 3 is required to be formed of a material that is low in absorbability of the welding light ray (the electromagnetic wave) to be irradiated. For example, a transparent synthetic resin, such as PMMA (polymethyl methacrylate), may be used.

As for the housing 2, because the welding face portion 21 is brought into an excited state and generates heat due to the irradiation of the welding light ray (the electromagnetic wave), a material of the housing 2 is required to have a molecular structure configured by radicals having a vibration period that coincides with the wavelength of the welding light ray (the electromagnetic wave) to be irradiated.

As shown in FIG. 2, the transparent cover 3 has a smooth shape, and a thickness thereof is substantially constant. The front face 32 is largely curved, and respective end portions thereof in one section, e.g., upper and lower end portions $32u$, $32d$ are inclined to opposite directions by angles $\theta u$, $\theta d$ with respect to a base line X-X (a line of an optical axis of the light source 5), respectively.

Figure 3:
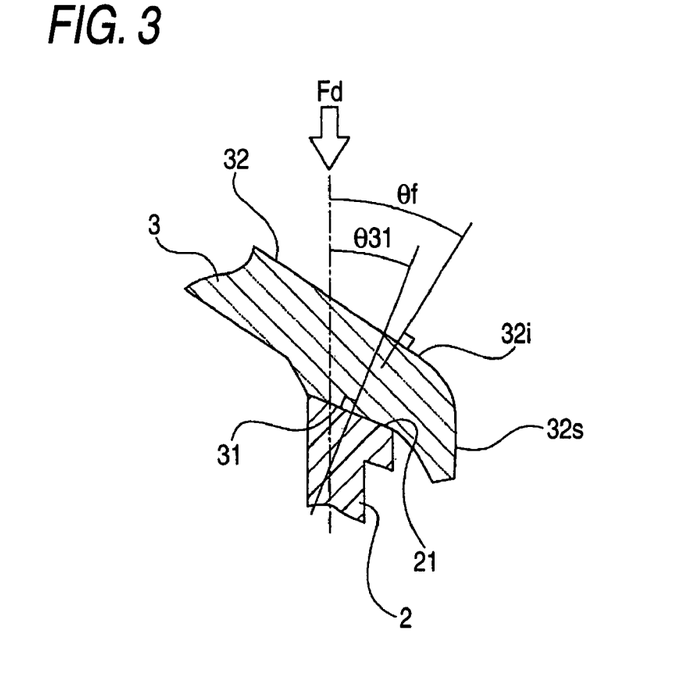
FIG. 3 is an enlarged sectional view of a portion surrounded by a circle III in FIG. 2.

FIG. 3 shows an enlarged sectional view of a portion surrounded by a circle III in FIG. 2, that is, the upper end portion $32u$.

As described above, when performing the light ray welding, if the two welding face portions 21, 31 are not in a closely contacting state, the heat generated at the welding face portion 21 of the housing 2 is not effectively transmitted to the welding face portion 31 of the transparent cover 3, whereby a welding failure appears at the portion where the closely contacting state is insufficient. In the specification, "the closely contacting state" includes not only a state where two faces are actually in contact with other, but also a state where two faces are close to each other with a gap of 0.1 mm or less therebetween, because the two faces can be welded as long as the gap is 0.1 mm or less.

In order to place the two welding face portions 21, 31 in the closely contacting state, the transparent cover is applied with a pressing force from the front face side thereof to make the welding face portion 31 of the transparent cover 3 contact with the welding face portion 21 of the housing 2 with pressure. In this case, in order to apply the pressing force almost uniformly on the entire periphery of the welding face portion 31, the pressing force is required to be applied in a direction shown by an arrow Fd in FIG. 3. This pressing direction Fd is a direction which forms substantially equal angles $\theta f$ with respect to respective lines perpendicular to each of the end portions of the front faces (e.g. $32u$, $32d$) in at least one section.

If the inclination angle of the welding face portion 31 with respect to the direction Fd is same as that of the end portion of the front face 32, a surface pressure Fs applied in a direction perpendicular to the welding face portion 31 due to the pressing force F applied in the direction Fd can be expressed as Fs=F·cos θf.

Thus, the surface pressure Fs becomes smaller as θf becomes larger, and when the surface pressure Fs becomes small, the degree of adhesion between the two welding face portions 21 and 31 is degraded.

Therefore, in the vehicle lamp 1 according the exemplary embodiment, the transparent cover 3, where the welding face portion 31 of the rear face of is formed, is made thick such that an angle or a distance between the welding face portion 31 and the front face 32 becomes larger toward an inner side (that is, toward the center) of the vehicle lamp 1, whereby the welding face portion 31 has an inclination angle different from that of the front face 32. Accordingly, an angle θ31 between the pressing direction Fd and a line perpendicular to the welding face portion 31 is smaller than the angle θf. In this case, a surface pressure F31 applied in the direction perpendicular to the welding face portion 31 by the pressing force F applied in the direction Fd can be expressed as F31=F·cos θ31. Therefore, F31>Fs as θf>θ31.

When compared with the case where the inclination angle of the welding face portion 31 is same as that of the front face 32, a larger pressing force is applied between the two welding face portions 21 and 31, whereby the two welding face portions 21 and 31 can be reliably placed in the closely contacting state.

Figure 6:
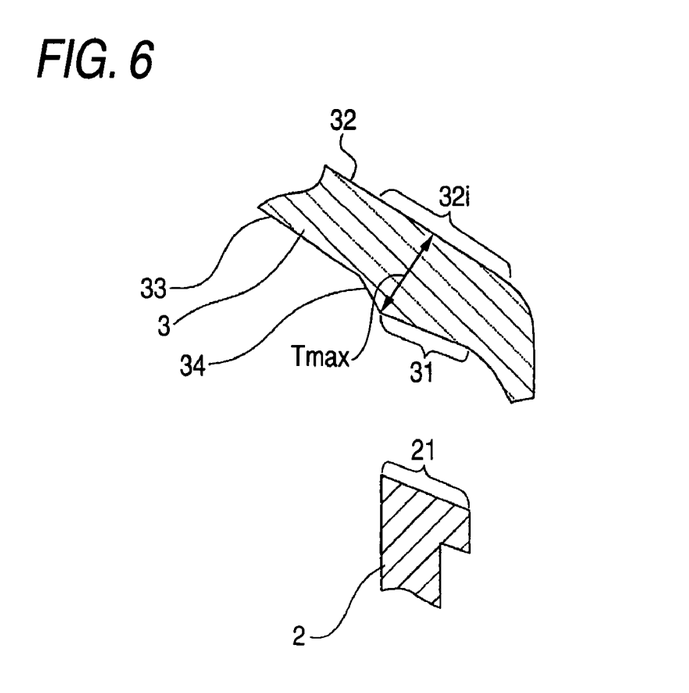
FIG. 6 is an enlarged sectional view in which a housing and the transparent cover are shown in an separated manner.

The maximum thickness Tmax (see FIG. 6) of a portion of the transparent cover 3 where the welding face portion 31 is formed is preferably 4.5 mm or less in order to prevent a molding sink from being generated due to an excessive change of the thickness at the time of the molding. Thus, deterioration of an appearance of the front face (a design surface) 32 of the transparent cover 3 can be avoided. Further, because the molding sink is prevented from being generated, diffused refraction of the welding light ray, such as a laser, can be prevented, thereby reducing the possibility of welding failures.

When making the transparent cover 3 to contact the housing 2 with pressure, the transparent cover 3 may be directly pressed. However, in such a case, pressing means is brought into a direct contact to the front face of the transparent cover 3, whereby the front face 32 of the transparent cover 3 serving as the design surface might be damaged. Further, in the case of directly applying the pressing force to the transparent cover 3, it is difficult to apply the pressing force almost uniformly on the entire periphery of the welding face portion 31.

Figure 4:
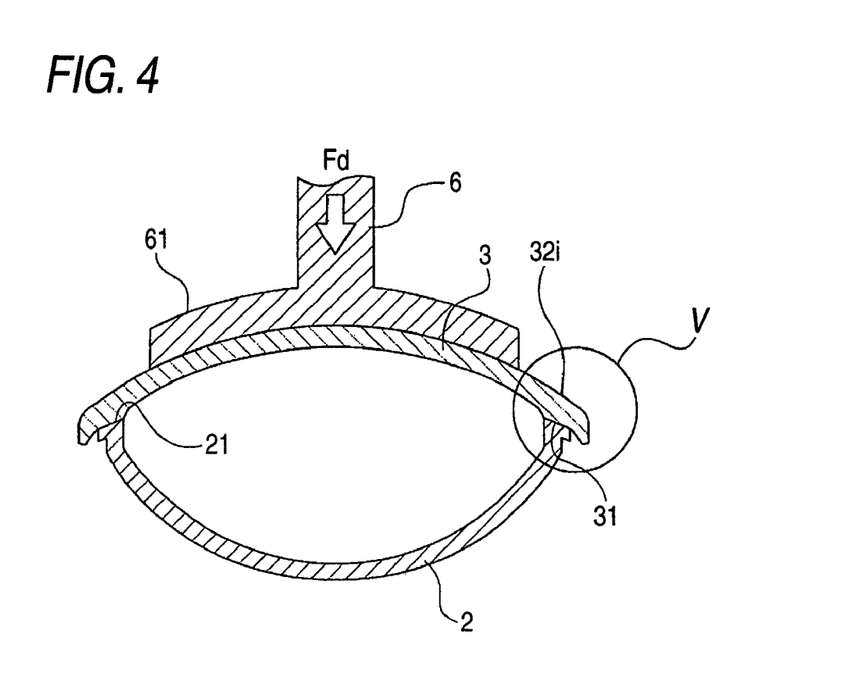
FIG. 4 is a schematic vertical sectional view showing an exemplary embodiment in which a pressing force is applied to a transparent cover via a pressing jig.

Therefore, as shown in FIG. 4, it is preferable to abut a pressing jig 6 against the front face 32 of the transparent cover 3, thereby applying the pressing force via the pressing jig 6.

Figure 5:
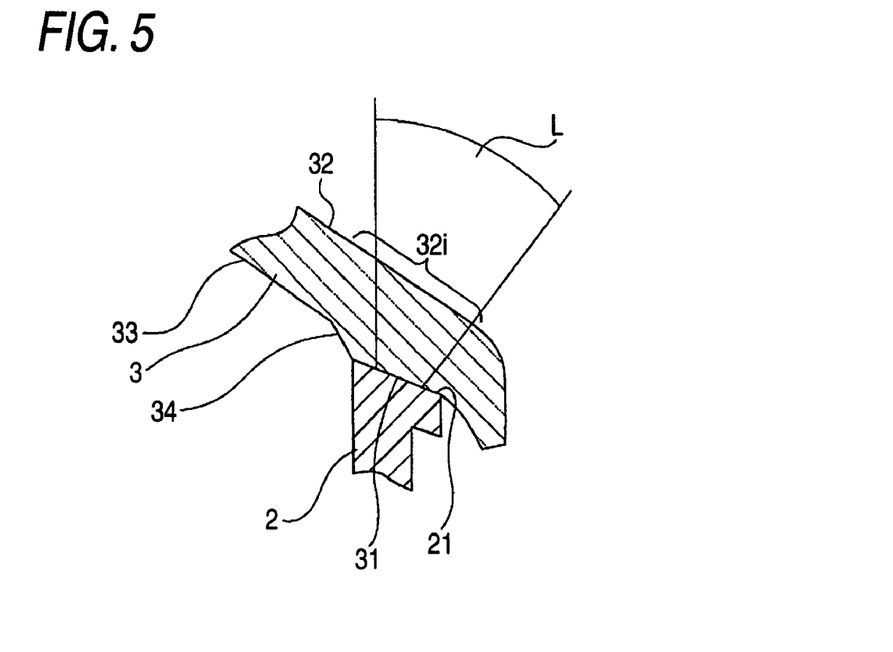
FIG. 5 is an enlarged sectional view of a portion surrounded by a circle V in FIG. 4.

As described above, the portion of the transparent cover 3, where the welding face portion 31 is formed, is made to have a larger thickness so that the welding face portion 31 has the inclination angle different from that of the light ray incident surface 32i. Accordingly, the peripheral edge portion of the rear face of the transparent cover 3 serving as the welding face portion 31 differs in its thickness from the inner side portion thereof, i.e., an illumination light transmitting portion 33 which transmits the illumination light from the light source 5, whereby a step surface 34 is produced between these two portions 33 and 31. In a case where this step surface 34 (an intermediate face portion) is formed to have an angle which exceeds a critical angle with respect to a welding light ray that is incident on the intermediate face portion 34, one problem is resolved.

Figure 8:
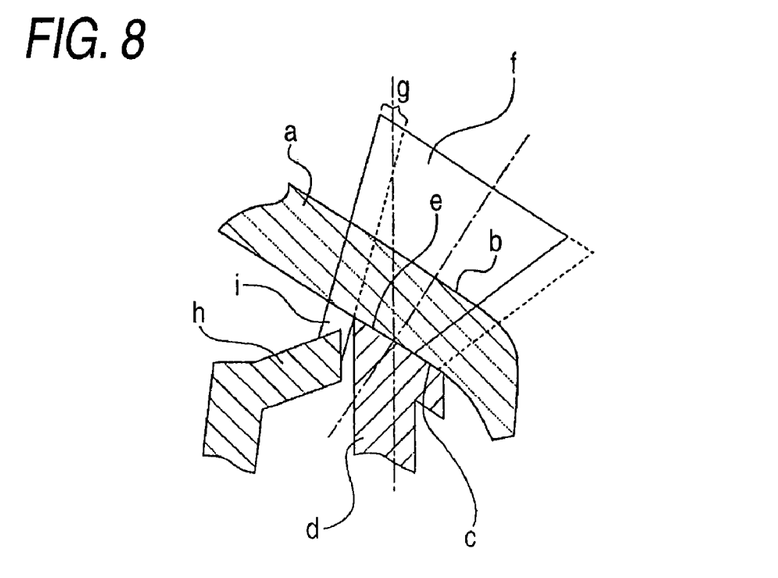
FIG. 8 is an enlarged sectional view of illustrating a problem that arises in the related art.

FIG. 8 shows an example where a light ray incident surface b and a welding face portion c have the same inclination angle, i.e., a transparent cover a does not have a thick portion or an intermediate face portion at a rear face thereof, and where the transparent cover a is welded to a housing d by light ray welding. The welding face portion c of the transparent cover a is overlapped in a closely contacting state on a welding face portion e formed at a peripheral edge portion of an opening of the housing d, and a laser f is irradiated on the welding face portions e, c from the light ray incident surface b via the transparent cover. In this case, there is no problem when the laser light f is accurately irradiated on the welding face portions e, c. However, there is a case where the irradiation position of the laser light f is deviated inside. In such a case, a part g of the laser f is deviated toward an inner side from the welding face portion e of the housing d so that the laser is irradiated at the inner portion of the lamp. If there is another member disposed inside the lamp, e.g., an extension h, the part g of the laser light f is irradiated on the member h so that a portion i where the laser light is irradiated might be burned.

Figure 7:
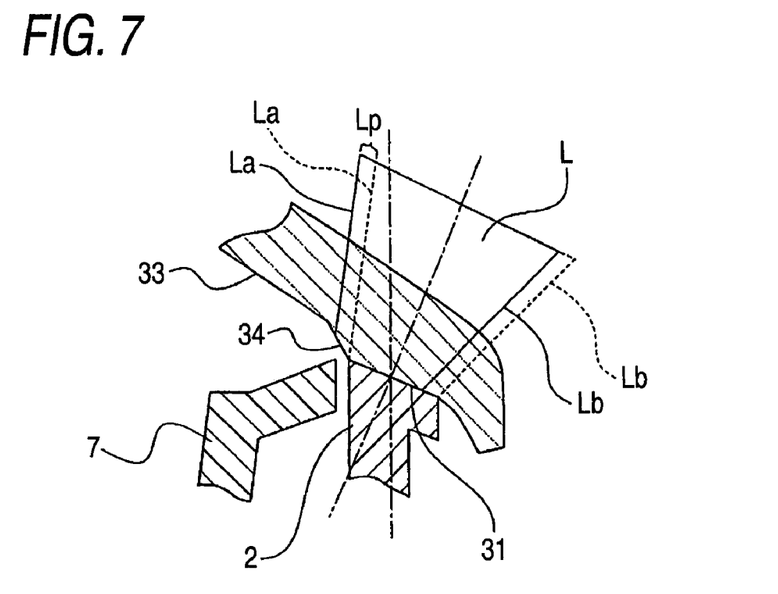
FIG. 7 is an enlarged sectional view illustrating a function of an intermediate face portion.

In view of above, in the vehicle lamp 1 according to an exemplary embodiment, the intermediate face portion 34 is formed between the welding face portion 31 and the illumination light transmitting portion 33 of the transparent cover 3. Therefore, when a laser L is deviated toward an inner side so that a part Lp of the laser L is deviated toward the inner side from the welding face portions 21, 31, the part Lp of the laser light is incident on the intermediate face portion 34 as shown in FIG. 7. In such a case, because the intermediate face portion 34 has the inclination so as to have an angle exceeding the critical angle with respect to the welding light ray, the part Lp of the laser is fully reflected by the intermediate face portion 34 and is directed outward. Thus, even when there is a member 7, such as an extension member, on a rear side of the intermediate face portion 34, there is no fear that the member 7 is damaged by the welding light ray, such as a laser, deviating from a target.

Figure 9:
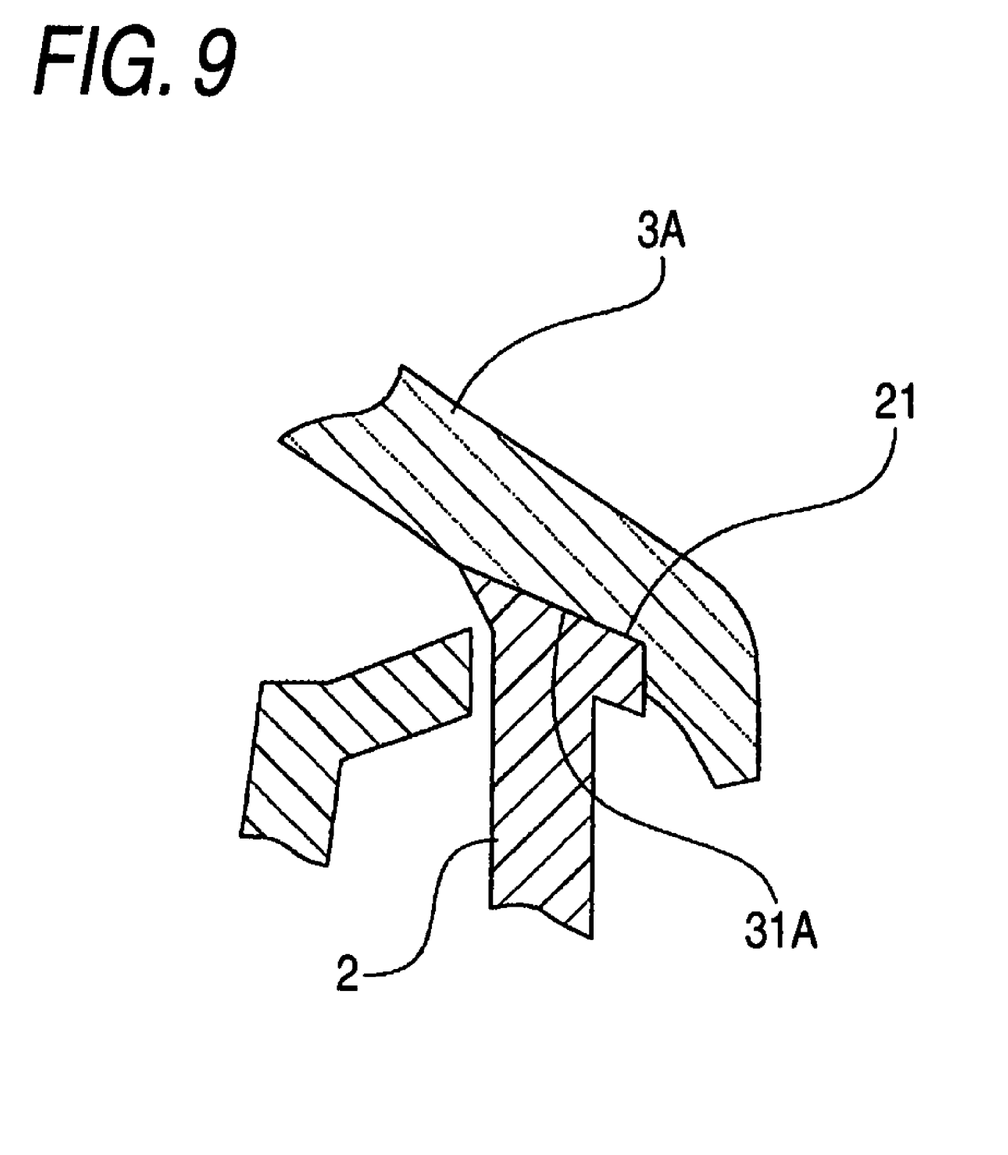
FIG. 9 is an enlarged sectional view of showing another exemplary embodiment of a method of forming a welding face portion.

In the exemplary embodiments described above, a thickness is added to the portion of the transparent cover where the welding face portion 31 is formed in order to provide the welding face portion 31 of the transparent cover 3 with the inclination angle different from that of the light ray incident surface 32i. However, as shown in FIG. 9, a circumferential portion of a rear face of a transparent cover 3A where a welding face portion 31A is formed may be partially removed to be thinner.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. A vehicle lamp comprising:
   a housing having a front opening;
   a molded transparent cover that closes the front opening of the housing when joined by light ray welding to the housing, the transparent cover comprising:
   a curved front face, and
   a rear face having a welding face portion along a circumferential portion thereof;
   wherein, in at least one section of the transparent cover,
   respective end portions of the curved front face corresponding to the welding face portion are inclined in different directions, and
   the welding face portion is inclined with respect to the end portions of the front face such that an angle of the welding face portion with respect to a reference line, which passes through the transparent cover and forms equal angles with respect to the respective end portion of the front face, is closer to a right angle than an angle of each of the end portions of the front face with respect to the reference line, and wherein a maximum thickness of a portion of the transparent cover where the welding face portion is formed is 4.5 mm or less.

2. The vehicle lamp according to claim 1, wherein a ratio between a maximum thickness of a portion of the transparent cover where the welding face portion is formed with respect to a thickness of another portion of the transparent cover situated nearer to a center of the transparent cover in relation to the welding surface is less than 1.5.

3. The vehicle lamp according to claim 1, wherein the rear face of the transparent cover further comprises an illumination light transmitting portion and an intermediate face portion formed between the welding face portion and the illumination light transmitting portion, wherein the intermediate face portion is inclined so as to form an angle exceeding a critical angle with respect to a welding light ray that is incident on the intermediate face portion.

4. The vehicle lamp according to claim 3, further comprising an extension member on a rear side of the intermediate face portion.

5. A method of manufacturing a vehicle lamp, the method comprising:

providing a housing comprising a front opening;

providing a molded transparent cover comprising a curved front face and a rear face comprising a welding face portion along a circumferential portion thereof;

placing the welding face portion of the transparent cover in a closely contacting state with respect to the housing; and joining the transparent cover and the housing so as to close the front opening of the housing by irradiating a welding light ray toward the welding face portion through the transparent cover, wherein the placing includes applying a pressing force against the housing to the transparent cover in a predetermined direction such that an angle of the welding face portion of the transparent cover with respect to the predetermined direction is closer to a right angle than an angle of the front face of the transparent cover corresponding to the welding surface with respect to the predetermined direction, and wherein a maximum thickness of a portion of the transparent cover where the welding face portion is formed is 4.5 mm or less.

6. The method of manufacturing a vehicle lamp according to claim 5, wherein the welding face portion of the transparent cover and the front face of the transparent cover corresponding to the welding face portion are inclined in different directions.

7. The method of manufacturing a vehicle lamp according to claim 5, wherein the pressing force is applied to the front face of the transparent cover via a jig.

8. The method of manufacturing a vehicle lamp according to claim 5, wherein the welding light ray is a laser.

9. The method of manufacturing a vehicle lamp according to claim 5, wherein a ratio between a maximum thickness of a portion of the transparent cover where the welding face portion is formed with respect to a thickness of another portion of the transparent cover situated nearer to a center of the transparent cover in relation to the welding surface is less than 1.5.

10. The method of manufacturing a vehicle lamp according to claim 5, wherein the predetermined direction in which the pressing force is applied forms, in at least one section of the transparent cover, equal angles with respect to respective end portions of the front face corresponding to the welding face portion.

* * * * *